H. K. PORTER.
METAL CUTTING TOOL.
APPLICATION FILED JAN. 2, 1915.

1,161,526. Patented Nov. 23, 1915.

Witnesses:
Franklin E. Low
Harman R. Hoffman

Inventor:
Henry K. Porter
by his attorney,
Charles S. Goodwin

UNITED STATES PATENT OFFICE.

HENRY K. PORTER, OF BOSTON, MASSACHUSETTS.

METAL-CUTTING TOOL.

1,161,526.

Specification of Letters Patent.

Patented Nov. 23, 1915.

Application filed January 2, 1915. Serial No. 35.

*To all whom it may concern:*

Be it known that I, HENRY K. PORTER, a citizen of the United States, residing at Boston, in the county of Suffolk and State of Massachusetts, have invented new and useful Improvements in Metal-Cutting Tools, of which the following is a specification.

This invention relates to a tool for cutting metal and is especially adapted for cutting rods and bolts.

The object of the invention is to provide a powerful hand tool for the purpose specified and one in which the cutting edges of the tool may be quickly and accurately adjusted relatively to each other so as to bring said cutting edges accurately together and make up for any material lost by wear, breakage or by grinding said cutting edges.

The invention consists in the combination and arrangement of parts set forth in the following specification and particularly pointed out in the claims.

Figure 1:
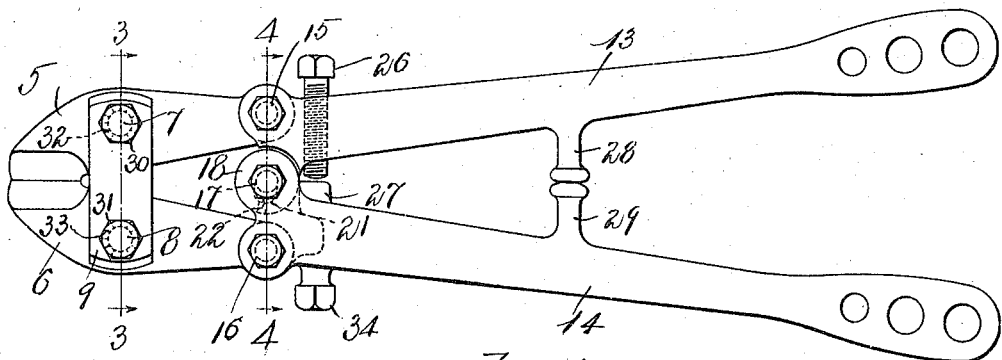
Figure 2:
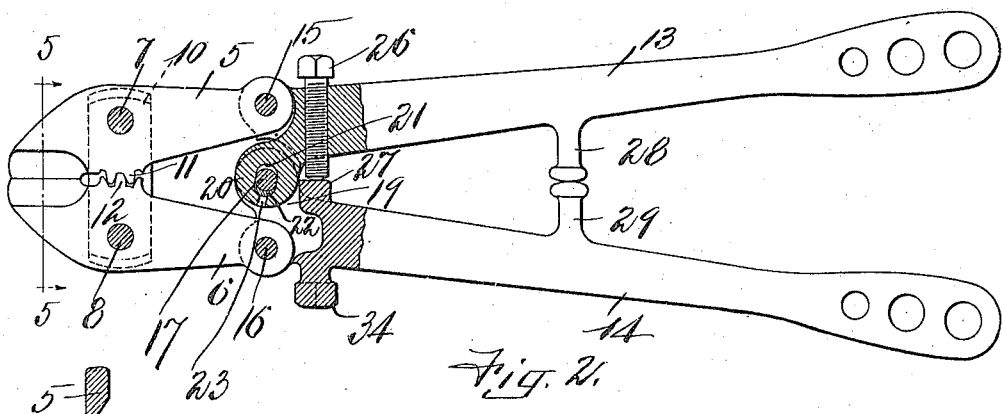
Figures 3, 4, 5, 6:
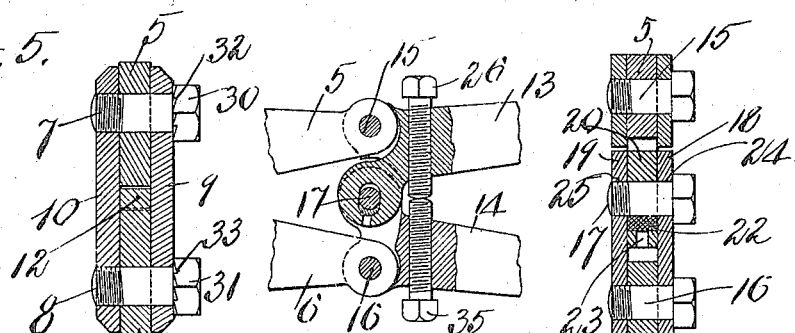

Referring to the drawings: Figure 1 is a plan view of my improved cutting tool. Fig. 2 is a plan view of the same partly broken away and shown in section, with the parts adjusted to place them in slightly different positions relatively to each other and to bring the cutting edges together. Fig. 3 is an enlarged sectional elevation taken on line 3—3 of Fig. 1. Fig. 4 is an enlarged sectional elevation taken on line 4—4 of Fig. 1. Fig. 5 is a detail section taken on line 5—5 of Fig. 2. Fig. 6 is a detail sectional view of a modified form.

Like numerals refer to like parts throughout the several views of the drawings.

In the drawings, 5 and 6 are cutter levers which are pivotally connected to each other by pivotal screws 7 and 8, respectively, said screws projecting through a strap plate 9 and having screw-threaded engagement with another strap plate 10. Said cutter levers are further connected together by teeth 11 on the cutter lever 5 meshing into teeth 12 provided on the cutter lever 6. A pair of handles 13 and 14 are pivotally connected to the cutter levers 5 and 6 by pivotal screws 15 and 16, respectively. A pivot 17 connects the handles 13 and 14 together.

The handle 14 is bifurcated to form two ears 18 and 19 and between these ears an ear 20 on the handle 13 projects. The ear 20 is provided with a slot 21 which, when the tool is new, is filled with malleable material 22, such as lead. A port 23 leads out of one end of the slot 21.

The pivot 17 is preferably made in the form of a screw which extends through holes 24 and 25 in the ears 18 and 19, respectively, and has screw-threaded engagement with the ear 19. Said pivotal screw 17 extends through the slot 21 and engages the malleable material or lead 22 therein.

A screw 26 having screw-threaded engagement with the handle 13 forms an adjustable stop constituting an auxiliary fulcrum which is adapted to engage when properly adjusted another stop 27 forming a part of the handle 14.

A permanent stop 28 on the handle 13 abuts against another stop 29 forming a portion of the handle 14 when the parts are in the proper relation to each other so that the cutting edges of the cutters 5 and 6 just engage each other.

When the metal is being cut by my improved tool the natural tendency of the movement of the cutter levers 5 and 6 upon their respective pivots 7 and 8 is to turn said pivots to the left and right, respectively, and, therefore, the screw-threads on the pivots 7 and 8, where they screw into the plate 10, are made left and right, respectively. It would, however, be undesirable to keep screwing up said pivotal screws 7 and 8, for the reason that it would bind the strap plates 9 and 10 against the cutter levers 5 and 6 and make it difficult to move the same to perform their work, and to overcome this tendency the heads 30 and 31 of the screws 7 and 8, respectively, are provided with teeth 32 and 33, respectively, upon their under faces, these teeth being cut in opposite directions so as to oppose any tendency of the screws 7 and 8 to bind the plates 9 and 10 against the cutter levers 5 and 6.

The general operation of the device hereinbefore described is as follows: In Fig. 1 the tool is shown with the cutting edges of the cutter levers 5 and 6 meeting and with the stops 28 and 29 abutting, while the stop screw 26 is adjusted so as not to abut against the stop 27 on the handle 14. To open the cutter levers 5 and 6 the handles 13 and 14 are moved apart and vice versa. Assuming that the malleable material 22 fills the slot 21 when the tool is new, then the parts would be in the relative positions illustrated in Fig. 1 when the cutting edges of the cutter levers 5 and 6 meet and at this time the pivotal screw 17 would be at the upper end of the slot 21, as illustrated in dotted lines (Fig. 1). After the cutting edges of the cutter levers 5 and 6 have worn away or been sharpened so as to wear them away and it is desired to bring said cutting edges together, then the adjusting screw 26 is advanced until it meets the stop 27 on the handle 14 before the permanent stop 28 engages the stop 29 forming a part of the handle 14. Then when the handles are moved toward each other the screw 17 will be forced downwardly in the slot 21 by reason of the stop 26 encountering the stop 27 on the handle 14 and a portion of the lead 22 in said slot will be forced into and through the port 23. This will change the position of the pivot 17 in the slot 21, thus causing the pivots 15 and 16 to be forced apart by reason of the stop screw 26 abutting against the stop 27 and forming an auxiliary fulcrum about which the handles 13 and 14 rotate until the screw 17 moves downwardly in the slot 21 and hence as the pivots 15 and 16 are moved apart the cutter levers 5 and 6 will be moved apart on the side of their pivots adjacent to the pivots 15 and 16 and will be moved toward each other on the sides of their pivots upon which are located the cutting edges of said cutter levers. The screw 26 is advanced sufficiently so that when the cutting edges of the cutter levers 5 and 6 meet, the stop 28 will encounter the stop 29 on the handle 14 and the tool is then in condition to be used to the best advantage in its changed condition for cutting metal.

It will be noted that on the handle 14 there is a boss 34 which is integral with said handle and serves as a means, when the tool is japanned, for suspending said tool during the japanning operation, said tool being suspended by means of suitable clips which are connected to the boss 34 on one side of the tool and to the screw 26 on the opposite side.

It is also to be understood that I do not limit myself to a screw in one of the handles, as 13, and a stop as 27 on the handle 14 for said screw 26 to abut against, but that said stop 27 and the boss 34 may be replaced by a screw 35, as illustrated in detail in Fig. 6 without departing from the spirit of my invention.

Another object of the boss 34 is to make the tool appear symmetrical in its design.

Having thus described my invention, what I claim and desire by Letters Patent to secure is:

1. A metal cutting tool having, in combination, a pair of cutter levers pivotally connected to each other, a pair of handles, a pair of pivots directly connecting said cutter levers to said handles, a pivot connecting said handles together and located between said pair of pivots, said last-named pivot being fastened to one of said handles and projecting through a slot in the other of said handles, malleable material interposed between said last-named pivot and one end of said slot and a stop on one of said handles constructed and arranged to abut against the other of said handles, whereby upon forcing said handles toward each other said malleable material may be compressed and the location of said pivot in said slot changed.

2. A metal cutting tool having, in combination, a pair of cutter levers pivotally connected to each other, a pair of handles, a pair of pivots connecting said cutter levers to said handles, a pivot connecting said handles together and located between said pair of pivots, said last-named pivot being fastened to one of said handles and projecting through a slot in the other of said handles, said slot being filled with malleable material between said last-named pivot and one end of said slot and having a port leading out of the same through which a portion of said malleable material may be forced.

3. A metal cutting tool having, in combination, a pair of cutter levers pivotally connected to each other, a pair of handles, a pair of pivots connecting said cutter levers to said handles, a pivot connecting said handles together and located between said pair of pivots, said last-named pivot being fastened to one of said handles and projecting through a slot in the other of said handles, said slot being filled with malleable material between said last-named pivot and one end of said slot and having a port leading out of the same through which a portion of said malleable material may be forced and an adjustable stop on one of said handles constructed and arranged to abut against the other of said handles adjacent to said last-named pivot.

4. A metal cutting tool having, in combination, a pair of cutter levers pivotally connected to each other, a pair of handles, a pair of pivots connecting said cutter levers to said handles, a pivot connecting said handles together and located between said pair of pivots, said last-named pivot being fastened to one of said handles and projecting through a slot in the other of said handles, said slot being filled with malleable material between said last-named pivot and one end of said slot and having a port leading out of the same through which a portion of said malleable material may be forced, an adjustable stop on one of said handles constructed and arranged to abut against the other of said handles adjacent to said last-named pivot and a permanent stop on one of said handles adapted to abut against the other of said handles when the cutting edges of said cutters are in contact with each other.

5. A metal cutting tool having, in combination, a pair of cutter levers pivotally connected to each other, a pair of handles, a pair of pivots connecting said cutter levers to said handles, a pivot connecting said handles together and located between said pair of pivots, said last-named pivot being fastened to one of said handles and projecting through a slot in the other of said handles, and an adjustable stop on one of said handles immediately adjacent to said last-named pivot constructed and arranged to abut against the other of said handles and constituting an auxiliary fulcrum.

6. A metal cutting tool having, in combination, a pair of cutter levers pivotally connected to each other, a pair of handles, a pair of pivots connecting said cutter levers to said handles, a pivot connecting said handles together and located between said pair of pivots, said last-named pivot being fastened to one of said handles and projecting through a slot in the other of said handles, a stop on one of said handles immediately adjacent to said last-named pivot constructed and arranged to abut against the other of said handles and a permanent stop on one of said handles adapted to abut against the other of said handles when the cutting edges of said cutters are in contact with each other.

In testimony whereof I have hereunto set my hand in presence of two subscribing witnesses.

HENRY K. PORTER.

Witnesses:
CHARLES S. GOODING,
SYDNEY E. TAFT.

Copies of this patent may be obtained for five cents each, by addressing the "Commissioner of Patents, Washington, D. C."